(12) United States Patent
Mun

(10) Patent No.: US 11,588,989 B2
(45) Date of Patent: Feb. 21, 2023

(54) IMAGE SENSING DEVICE

(71) Applicant: SK hynix Inc., Icheon-si (KR)

(72) Inventor: Hye Won Mun, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/499,751

(22) Filed: Oct. 12, 2021

(65) Prior Publication Data

US 2022/0232180 A1     Jul. 21, 2022

(30) Foreign Application Priority Data

Jan. 15, 2021    (KR) .................. 10-2021-0005686

(51) Int. Cl.
    *H04N 5/355*        (2011.01)
    *H04N 5/3745*       (2011.01)

(52) U.S. Cl.
    CPC ....... *H04N 5/3559* (2013.01); *H04N 5/37457* (2013.01)

(58) Field of Classification Search
    CPC .............. H04N 5/3559; H04N 5/37457; H01L 27/146; H01L 27/14636; H01L 27/14641
    See application file for complete search history.

(56) References Cited

U.S. PATENT DOCUMENTS

| | | | | |
|---|---|---|---|---|
| 7,432,540 | B2 * | 10/2008 | McKee | H04N 5/37452 |
| | | | | 348/E3.018 |
| 8,158,921 | B2 * | 4/2012 | McKee | H04N 5/37457 |
| | | | | 257/292 |
| 9,247,170 | B2 * | 1/2016 | Komori | H04N 5/3559 |
| 10,510,796 | B1 * | 12/2019 | Wang | H01L 27/14636 |
| 2010/0188546 | A1 * | 7/2010 | McKee | H04N 5/37452 |
| | | | | 348/308 |
| 2019/0378864 | A1 * | 12/2019 | Innocent | H04N 5/374 |
| 2021/0098522 | A1 * | 4/2021 | Chen | H04N 5/357 |
| 2021/0358994 | A1 * | 11/2021 | Lee | H04N 5/3745 |

\* cited by examiner

*Primary Examiner* — Nhan T Tran
(74) *Attorney, Agent, or Firm* — Perkins Coie LLP

(57) ABSTRACT

An image sensing device includes a pixel array configured to include a first pixel belonging to a first row and a first column, and a second pixel belonging to a second row adjacent to the first row and a second column adjacent to the first column; and a dual conversion gain (DCG) capacitor coupled between the first pixel and the second pixel, and a first DCG transistor for selectively connecting the DCG capacitor to or disconnecting the DCG capacitor from a first floating diffusion region of the first pixel; and the second pixel includes a second floating diffusion region and a second DCG transistor for selectively connecting the DCG capacitor to or disconnecting the DCG capacitor from a second floating diffusion region of the second pixel.

19 Claims, 7 Drawing Sheets

IMAGE SENSING DEVICE

CROSS-REFERENCE TO RELATED APPLICATION

This disclosure claims the priority and benefits of Korean patent application No. 10-2021-0005686, filed on Jan. 15, 2021, the disclosure of which is incorporated herein by reference in its entirety as part of the disclosure of this disclosure.

TECHNICAL FIELD

The technology and implementations disclosed in this disclosure generally relate to an image sensing device including pixels capable of adjusting sensitivity.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various fields such as smart phones, digital cameras, game machines, IoT (Internet of Things), robots, security cameras and medical micro cameras.

Image sensing devices may be roughly divided into CCD (Charge Coupled Device) image sensing devices and CMOS (Complementary Metal Oxide Semiconductor) image sensing devices. The CCD image sensing devices offer a better image quality, but they tend to consume more power and are larger as compared to the CMOS image sensing devices. The CMOS image sensing devices are smaller in size and consume less power than the CCD image sensing devices. Furthermore, CMOS sensors are fabricated using the CMOS fabrication technology, and thus photosensitive elements and other signal processing circuitry can be integrated into a single chip, enabling the production of miniaturized image sensing devices at a lower cost. For these reasons, CMOS image sensing devices are being developed for many applications including mobile devices.

SUMMARY

Various embodiments of the disclosed technology relate to an image sensing device in which pixels capable of adjusting sensitivity are efficiently arranged.

In accordance with an embodiment of the disclosed technology, an image sensing device is provided to comprise: a pixel array configured to include a first pixel belonging to a first row and a first column, and a second pixel belonging to a second row adjacent to the first row and a second column adjacent to the first column, each of the first pixel and the second pixel including one or more photoelectric conversion elements structured to generate photocharges in response to incident light; and a dual conversion gain (DCG) capacitor coupled between the first pixel and the second pixel. The first pixel includes a first floating diffusion region configured to store the photocharges generated by the one or more photoelectric conversion elements of the first pixel and a first DCG transistor for selectively connecting the DCG capacitor to or disconnecting the DCG capacitor from the first floating diffusion region of the first pixel. The second pixel includes a second floating diffusion region configured to store the photocharges generated by the one or more photoelectric conversion elements of the second pixel and a second DCG transistor for selectively connecting the DCG capacitor to or disconnecting the DCG capacitor from the second floating diffusion region of the second pixel.

In accordance with another embodiment of the disclosed technology, an image sensing device is provided to include: a pixel array configured to include a first pixel at a first location and a second pixel arranged at a second location diagonal to the first location, each of the first pixel and the second pixel including one or more photoelectric conversion elements structured to generate photocharges in response to incident light. The first pixel includes a first dual conversion gain (DCG) gate configured to control a capacitance of a first floating diffusion region configured to store the photocharges generated by the first pixel. The second pixel includes a second DCG gate configured to control a capacitance of a second floating diffusion region configured to store the photocharges generated by the second pixel; and a common region is disposed at a contact surface between the first pixel and the second pixel and overlapping with each of the first DCG gate and the second DCG gate.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
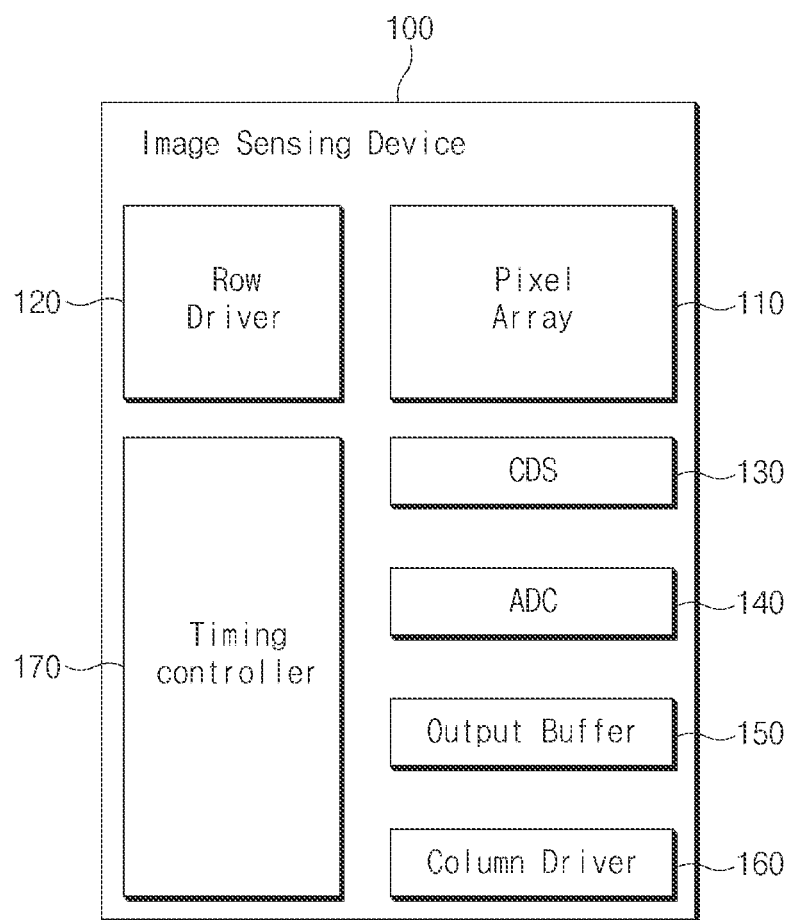
FIG. 1 is a block diagram illustrating an example of an image sensing device based on some implementations of the disclosed technology.

This disclosure provides implementations and examples of image sensing device designs that may be used in configurations to substantially addresses one or more technical or engineering issues and to mitigate limitations or disadvantages encountered in some other image sensing devices. Some implementations of the disclosed technology relate to the image sensing device in which pixels capable of adjusting sensitivity are efficiently arranged. The disclosed technology provides various implementations of an image sensing device which can acquire capacitance required for a low sensitivity mode by changing a layout structure of pixels, without increasing the size of each pixel or without using a capacitor that might cause a noise occurrence.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

FIG. 1 is a block diagram illustrating an image sensing device 100 according to an embodiment of the disclosed technology.

Referring to FIG. 1, the image sensing device 100 may include a pixel array 110, a row driver 120, a correlated double sampler (CDS) 130, an analog-digital converter (ADC) 140, an output buffer 150, a column driver 160 and a timing controller 170. The components of the image sensing device 100 illustrated in FIG. 1 are discussed by way of example only, and this disclosure encompasses numerous other changes, substitutions, variations, alterations, and modifications.

The pixel array 110 may include a plurality of unit imaging pixels arranged in rows and columns. In one example, the plurality of unit imaging pixels can be arranged in a two dimensional pixel array including rows and columns. In another example, the plurality of unit imaging pixels can be arranged in a three dimensional pixel array. The plurality of unit imaging pixels may convert an optical signal into an electrical signal on a unit pixel basis or a pixel group basis, where unit pixels in a pixel group share at least certain internal circuitry. The pixel array 110 may receive driving signals, including a row selection signal, a pixel reset signal and a transmission signal, from the row driver 120. Upon receiving the driving signal, corresponding unit imaging pixels in the pixel array 110 may be activated to perform the operations corresponding to the row selection signal, the pixel reset signal, and the transmission signal.

The row driver 120 may activate the pixel array 110 to perform certain operations on the imaging pixels in the corresponding row based on commands and control signals provided by controller circuitry such as the timing controller 170. In some implementations, the row driver 120 may select one or more imaging pixels arranged in one or more rows of the pixel array 110. The row driver 120 may generate a row selection signal to select one or more rows among the plurality of rows. The row decoder 120 may sequentially enable the pixel reset signal for resetting imaging pixels corresponding to at least one selected row, and the transmission signal for the pixels corresponding to the at least one selected row. Thus, a reference signal and an image signal, which are analog signals generated by each of the imaging pixels of the selected row, may be sequentially transferred to the CDS 130. The reference signal may be an electrical signal that is provided to the CDS 130 when a sensing node of an imaging pixel (e.g., floating diffusion node) is reset, and the image signal may be an electrical signal that is provided to the CDS 130 when photocharges generated by the imaging pixel are accumulated in the sensing node. The reference signal indicating unique reset noise of each pixel and the image signal indicating the intensity of incident light may be generically called a pixel signal as necessary.

CMOS image sensors may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured. In some embodiments of the disclosed technology, the CDS 130 may sequentially sample and hold voltage levels of the reference signal and the image signal, which are provided to each of a plurality of column lines from the pixel array 110. That is, the CDS 130 may sample and hold the voltage levels of the reference signal and the image signal which correspond to each of the columns of the pixel array 110.

In some implementations, the CDS 130 may transfer the reference signal and the image signal of each of the columns as a correlate double sampling signal to the ADC 140 based on control signals from the timing controller 170.

The ADC 140 is used to convert analog CDS signals into digital signals. In some implementations, the ADC 140 may be implemented as a ramp-compare type ADC. The ramp-compare type ADC may include a comparator circuit for comparing the analog pixel signal with a reference signal such as a ramp signal that ramps up or down, and a timer counts until a voltage of the ramp signal matches the analog pixel signal. In some embodiments of the disclosed technology, the ADC 140 may convert the correlate double sampling signal generated by the CDS 130 for each of the columns into a digital signal, and output the digital signal. The ADC 140 may perform a counting operation and a computing operation based on the correlate double sampling signal for each of the columns and a ramp signal provided from the timing controller 170. In this way, the ADC 140 may eliminate or reduce noises such as reset noise arising from the imaging pixels when generating digital image data.

The ADC 140 may include a plurality of column counters. Each column of the pixel array 110 is coupled to a column counter, and image data can be generated by converting the correlate double sampling signals received from each column into digital signals using the column counter. In another embodiment of the disclosed technology, the ADC 140 may include a global counter to convert the correlate double sampling signals corresponding to the columns into digital signals using a global code provided from the global counter.

The output buffer 150 may temporarily hold the column-based image data provided from the ADC 140 to output the image data. In one example, the output buffer 150 output the image data provided to the output buffer 150 from the ADC 140 and stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer 150 upon receiving a control signal from the timing controller 170, and sequentially output the image data, which are temporarily stored in the selected column of the output buffer 150. In some implementations, upon receiving an address signal from the timing controller 170, the column driver 160 may generate a column selection signal based on the address signal and select a column of the output buffer 150, outputting the image data as an output signal from the selected column of the output buffer 150.

The timing controller 170 may control operations of the row driver 120, the ADC 140, the output buffer 150 and the column driver 160.

The timing controller 170 may provide the row driver 120, the CDS 130, the ADC 140, the output buffer 150, and the column driver 160 with a clock signal required for the operations of the respective components of the image sensing device 100, a control signal for timing control, and address signals for selecting a row or column. In an embodiment of the disclosed technology, the timing controller 170 may include a logic control circuit, a phase lock loop (PLL) circuit, a timing control circuit, a communication interface circuit and others.

Figure 2:
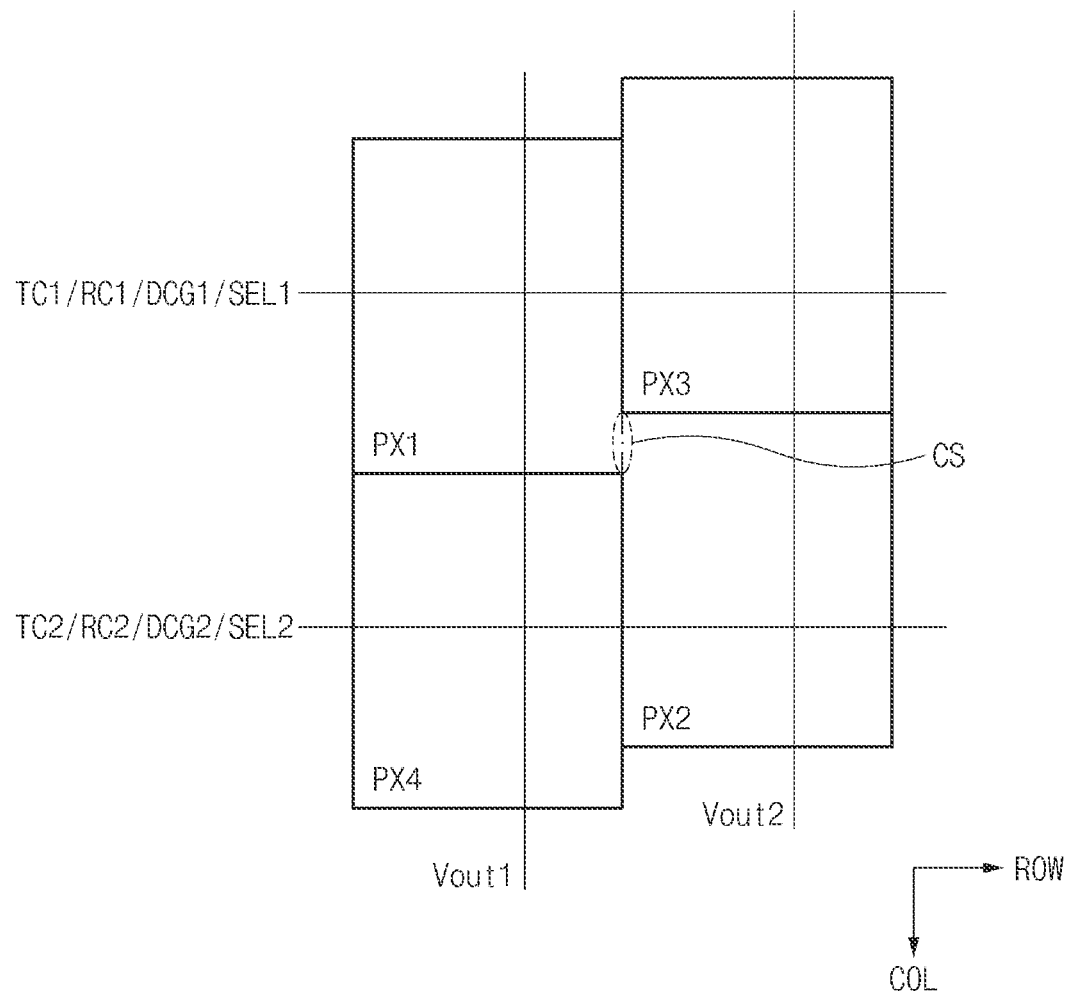
FIG. 2 is a schematic diagram illustrating an example of a pixel array shown in FIG. 1 based on some implementations of the disclosed technology.

FIG. 2 is a schematic diagram illustrating an example of a pixel array shown in FIG. 1 based on some implementations of the disclosed technology.

Referring to FIG. 2, a pixel array 200 may be an example of some parts of the pixel array 110 shown in FIG. 1, and may include first to fourth pixels PX1 to PX4 arranged in a (2×2) matrix array. Although FIG. 2 shows that the pixel array 200 includes only four pixels PX1 to PX4, other implementations are also possible. For example, the pixel array 200 may correspond to an (M×N) matrix array (where each of M and N is an integer of 2 or more) that includes a plurality of pixels including the first to fourth pixels PX1 to PX4 that are repeatedly arranged in a row direction (ROW) and a column direction (COL).

Each of the first to fourth pixels PX1 to PX4 may convert the intensity of incident light into an electrical signal, and may then output the electrical signal. To this end, each of the first to fourth pixels PX1 to PX4 may include at least one photoelectric conversion element, a floating diffusion (FD) region, and a plurality of transistors. In this case, the at least one photoelectric conversion element in each pixel may convert the intensity of incident light into photocharges, the floating diffusion (FD) region may accumulate the photocharges therein, and the plurality of transistors in each pixel may convert the photocharges into an electrical signal as an output of the pixel. Specifically, the plurality of transistors may include a transfer transistor for moving photocharges from the photoelectric conversion element to the floating diffusion (FD) region, a reset transistor for resetting the floating diffusion (FD) region, a dual conversion gain (DCG) transistor for selectively providing additional capacitance to the floating diffusion (FD) region, a source follower transistor for converting a voltage level of the floating diffusion (FD) region into electrical signals, and a selection transistor for outputting the electrical signals to an output signal line.

The row driver 120 may transmit control signals for controlling the plurality of transistors to each of the pixels PX1 to PX4. The control signals may include a transfer control signal for controlling the transfer transistor, a reset control signal for controlling the reset transistor, a DCG control signal for controlling the DCG transistor, and a selection control signal for controlling the selection transistor.

The row driver 120 may provide the control signals through control signal lines extending in the row direction (ROW). Thus, the pixels PX1 to PX4 included in the pixel array 200 may be driven on a row basis.

In more detail, the first pixel PX1 and the third pixel PX3 belonging to the first row may receive a first transfer control signal TC1, a first reset control signal RC1, a first DCG control signal DCG1, and a first selection control signal SEL1 through the same control signal line. Although FIG. 2 illustrates only one control signal line for the first and third pixels PX1 and PX3, other implementations are also possible. For example, there may exist control signal lines for providing the first transfer control signal TC1, the first reset control signal RC1, the first DCG control signal DCG1, and the first selection control signal SEL1, respectively.

The second pixel PX2 and the fourth pixel PX4 belonging to the second row may receive a second transfer control signal TC2, a second reset control signal RC2, a second DCG control signal DCG2, and a second selection control signal SEL2 through the same control signal line. In some implementations, the second transfer control signal TC2, the second reset control signal RC2, the second DCG control signal DCG2, and the second selection control signal SEL2 can be provided through the respective control signal lines.

Each of the pixels PX1 to PX4 included in the pixel array 200 may output an electrical signal (i.e., a pixel signal) through the output signal line extending in the column direction (COL). Each of the first pixel PX1 and the fourth pixel PX4 belonging to the first column may output a pixel signal through a first output signal line (Vout1). Each of the second pixel PX2 and the third pixel PX3 belonging to the second column may output a pixel signal through a second output signal line (Vout2).

In general, the four adjacent pixels PX1, PX2, PX3 and PX4 in the two adjacent rows and columns are arranged so that the pixels PX1 and PX2 are diagonal to each other and pixels PX3 and PX4 are diagonal to each other. Referring to FIG. 2, the four adjacent pixels PX1, PX2, PX3 and PX4 in the two adjacent rows and columns are not aligned in row and column and are specifically designed with a small spatial shift in the column direction between two adjacent column so that, although the first pixel PX1 and the third pixel PX3 belong to the first row, the third pixel PX3 belonging to the second column may be spatially shifted (e.g., upward as illustrated in this example) by a predetermined width in the column direction (COL) as compared to the first pixel PX1 belonging to the first column. Similarly, although the second pixel PX2 and the fourth pixel PX4 belong to the second row, the second pixel PX2 belonging to the second column may be spatially shifted upward by a predetermined width in the column direction (COL) as compared to the fourth pixel PX4 belonging to the first column.

Accordingly, due to this spatial shift, the first pixel PX1 in the first column and the second pixel PX2 in the second adjacent column may be in contact with each other through a contact surface CS corresponding to the predetermined width.

This arrangement is different from various other pixel layout in imaging sensors where the four adjacent pixels PX1, PX2, PX3 and PX4 in the two adjacent rows and columns are aligned in row and column without any shift so that the pixels PX1 and PX2 are diagonal to each other without any spatial overlap and pixels PX3 and PX4 are diagonal to each other without any spatial overlap.

Under this spatially shifted pixel layout in FIG. 2, the first pixel PX1 and the second pixel PX2 may be located in two adjacent different rows from each other and in two adjacent different columns from each other. Thus, the first pixel PX1 and the second pixel PX2 may be arranged in a diagonal direction with respect to either the row direction (ROW) or the column direction (COL). Therefore, the first pixel PX1 and the second pixel PX2 may receive control signals through different control signal lines, and may output pixel signals through different output lines. The first pixel PX1 and the second pixel PX2 may be coupled to each other through the contact surface CS, and may thus share at least one element.

In some implementations, the first pixel PX1 and the second pixel PX2 may be coupled to each other through the contact surface CS, such that at least some parts of DCG transistors of the first pixel PX1 and the second first pixel PX2 can be shared with each other.

Figure 3:
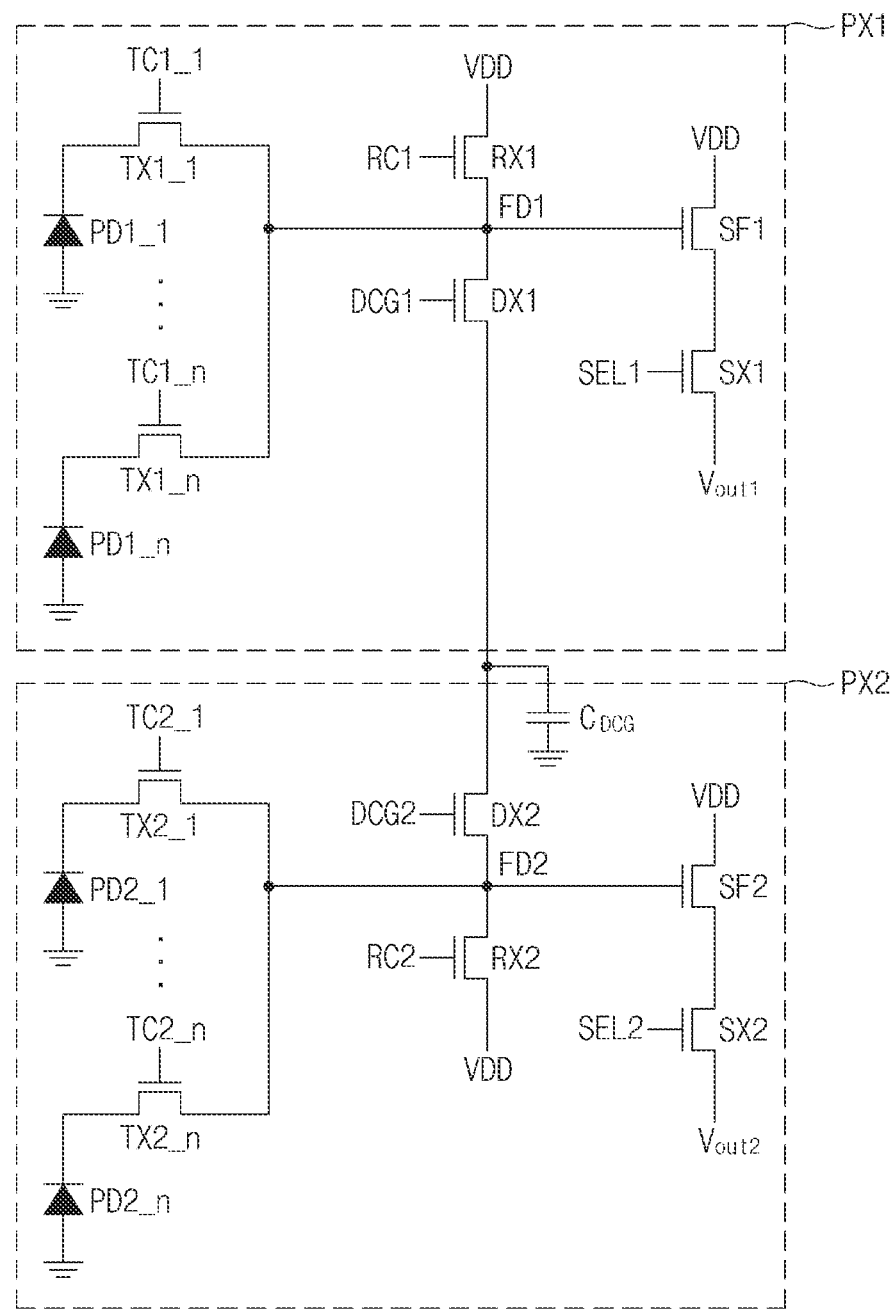
FIG. 3 is a circuit diagram illustrating an example of a first pixel and a second pixel shown in FIG. 2 based on some implementations of the disclosed technology.

FIG. 3 is a circuit diagram 300 illustrating an example of the first pixel PX1 and the second pixel PX2 shown in FIG. 2 based on some implementations of the disclosed technology.

The circuit diagram 300 including the first pixel PX1 and the second pixel PX2 shown in FIG. 2 are illustrated in FIG. 3.

The first pixel PX1 may include a plurality of first photoelectric conversion elements PD1_1 to PD1_$n$ (where 'n' is an integer of 2 or more), a plurality of first transfer transistors TX1_1 to TX1_$n$, a first reset transistor RX1, a first DCG transistor DX1, a first floating diffusion (FD) region FD1, a first source follower transistor SF1, and a first selection transistor SX1. The first pixel PX1 may refer to a shared pixel configured to include the plurality of first photoelectric conversion elements PD1_1 to PD1_$n$. The first pixel PX1 includes the first transfer transistors TX1_1 to TX1_$n$ arranged to respectively correspond to the first photoelectric conversion elements PD1_1 to PD1_$n$. The remaining elements other than the first transfer transistors TX1_1 to TX1_$n$ in the first pixel PX1 may be shared by the first photoelectric conversion elements PD1_1 to PD1_$n$.

Each of the first photoelectric conversion elements PD1_1 to PD1_$n$ may generate and accumulate photocharges corresponding to the intensity of incident light. For example, each of the first photoelectric conversion elements PD1_1 to PD1_$n$ may be implemented as a photodiode, a phototransistor, a photogate, or a pinned photodiode or a combination thereof.

If each of the first photoelectric conversion elements PD1_1 to PD1_$n$ is implemented as a photodiode, each of the first photoelectric conversion elements PD1_1 to PD1_$n$ may be a region that is doped with second conductive impurities (e.g., N-type impurities) in a substrate including first conductive impurities (e.g., P-type impurities). As an example, the substrate will hereinafter be referred to as a first conductive substrate such as a P-type substrate.

Each of the first transfer transistors TX1_1 to TX1_$n$ may be coupled in series between the first floating diffusion (FD) region FD1 and a corresponding one of the first photoelectric conversion elements PD1_1 to PD1_$n$. The first transfer transistors TX1_1 to TX1_$n$ may be turned on or off in response to the first transfer control signals TC1_1 to TC1_$n$, respectively. If the first transfer transistor TX1_1 is turned on, the first transfer transistor TX1_1 can transfer photocharges accumulated in the corresponding photoelectric conversion element to the first floating diffusion (FD) region FD1.

In some implementations, the first transfer transistors TX1_1 to TX1_$n$ can be sequentially turned on. In some other implementations, at least two first transfer transistors can be simultaneously turned on.

The first reset transistor RX1 may be coupled between a power-supply voltage (VDD) and the first floating diffusion (FD) region FD1, and may reset the voltage of the first floating diffusion (FD) region FD1 to the power-supply voltage (VDD) in response to a first reset control signal RC1.

Other pixels are similarly constructed as the first pixel PX1 and are under a similar circuit sharing configuration. For example, the pixel PX2 may include a plurality of second photoelectric conversion elements PD2_1 to PD2_$n$ (where 'n' is an integer of 2 or more), a plurality of second transfer transistors TX2_1 to TX2_$n$, a second reset transistor RX2, a second DCG transistor DX2, a second floating diffusion (FD) region FD2, a second source follower transistor SF2, and a second selection transistor SX2.

Notably, in the example in FIG. 3, a DCG capacitor ($C_{DCG}$) may be coupled between the first DCG transistor DX1 and the second DCG transistor DX2 to be shared by two diagonal pixels PX1 and PX2 with the overlapping contact surface CS as shown in FIG. 2 by connecting DX1 and DX2 to the shared DCG capacitor ($C_{DCG}$).

Specifically as shown in FIG. 3, the first DCG transistor DX1 may be coupled between the second DCG transistor DX2 of the second pixel PX2 and the first floating diffusion (FD) region FD1, and may allow the DCG capacitor ($C_{DCG}$) coupled between the first DCG transistor DX1 and the second DCG transistor DX2 to be selectively coupled to the first floating diffusion (FD) region FD1 in response to the first DCG control signal DCG1. The DCG capacitor ($C_{DCG}$) may be a region that is doped with second conductive impurities (e.g., N-type impurities) in the substrate (e.g., a first conductive substrate or a P-type substrate) including first conductive impurities (e.g., P-type impurities), and may be modeled as a single junction capacitor.

The first pixel PX1 may operate in two operation modes including a high sensitivity mode and a low sensitivity mode.

The high sensitivity mode may refer to a mode having a relatively large increase in response due to an increase in the intensity of incident light. The "response" may refer to a pixel signal generated by the first pixel PX1 having detected the intensity of incident light. Thus, the high sensitivity mode may refer to a mode having a relatively high sensitivity to incident light.

The low sensitivity mode may refer to a mode having a relatively small increase in response due to an increase in the intensity of incident light. Thus, the low sensitivity mode may refer to a mode having a relatively low sensitivity to incident light.

The sensitivity of the first pixel PX1 or the second pixel PX2 may be determined by photocharge storage capacity (or capacitance) of the first floating diffusion (FD) region FD1 or FD2 which can be changed by being connected to or disconnected from the DCG capacitor ($C_{DCG}$). This is explained in detail below using the first pixel PX 1 as an example.

In the high sensitivity mode, photocharge storage capacity of the first floating diffusion (FD) region FD1 may be set to a relatively low level. In a situation in which the photocharge storage capacity of the first floating diffusion (FD) region FD1 is at a relatively low level, if predetermined photocharges are accumulated (or stored) in the first floating diffusion (FD) region FD1, a voltage change of the first floating diffusion (FD) region FD1 may be relatively large so that a voltage change of the electrical signal generated by the first source follower transistor SF1 may be relatively large, resulting in an increase in sensitivity of the first pixel PX1. In order to reduce photocharge storage capacity of the first floating diffusion (FD) region FD1 in the high sensitivity mode, the first DCG transistor DX1 may be turned off so that capacitance of the DCG capacitor ($C_{DCG}$) may not be provided to the first floating diffusion (FD) region FD1.

In the low sensitivity mode, on the other hand, photocharge storage capacity of the first floating diffusion (FD) region FD1 may be set to a relatively high level. In a situation in which the photocharge storage capacity of the first floating diffusion (FD) region FD1 is at a relatively high level, if predetermined photocharges are accumulated (or stored) in the first floating diffusion (FD) region FD1, a voltage change of the first floating diffusion (FD) region FD1 may be relatively low so that a voltage change of the electrical signal generated by the first source follower transistor SF1 may be relatively low, resulting in reduction in sensitivity of the first pixel PX1. In order to reduce photocharge storage capacity of the first floating diffusion (FD) region FD1 in the low sensitivity mode, the first DCG transistor DX1 may be turned on so that capacitance of the DCG capacitor ($C_{DCG}$) may be provided to the first floating diffusion (FD) region FD1.

High dynamic range (HDR) can be implemented using both a response of the high sensitivity mode suitable for the low-illuminance range and a response of the low sensitivity mode suitable for the high-illuminance range. As compared to the other case in which any one of the high sensitivity mode and the low sensitivity mode is used, the above-mentioned case in which both the high sensitivity mode and the low sensitivity mode are used can allow the first pixel PX1 to have a high dynamic range (HDR) corresponding to a specific range from a minimum value of the high-sensitivity-mode dynamic range to a maximum value of the low-sensitivity-mode dynamic range. In this case, the dynamic range of the pixel may refer to the range of incident light intensity where the first pixel PX1 can have a valid response indicating the intensity of incident light.

In some other implementations, the first pixel PX1 may have not only the high sensitivity mode and the low sensitivity mode, but also an ultra-low sensitivity mode having a lower sensitivity than the low sensitivity mode.

The first floating diffusion (FD) region FD1 in the ultra-low sensitivity mode may have a larger photocharge storage capacity than the first floating diffusion (FD) region FD1 in the low sensitivity mode. In order to further increase the photocharge storage capacity of the first floating diffusion (FD) region FD1 in the ultra-low sensitivity mode, the first DCG transistor DX1 and the second DCG transistor DX2 are turned on, so that capacitance of the DCG capacitor ($C_{DCG}$) and capacitance of the second floating diffusion (FD) region FD2 can be provided to the first floating diffusion (FD) region FD1.

High dynamic range (HDR) can be implemented not only using a response of the high sensitivity mode suitable for a low-illuminance range and a response of the low sensitivity mode suitable for a high-illuminance range, but also using a response of the ultra-low sensitivity mode suitable for a super-high illuminance range. As a result, the first pixel PX1 may have a more extended dynamic range as compared to the other case in which both the high sensitivity mode and the low sensitivity mode are used.

In the low sensitivity mode, when the first DCG transistor DX1 is turned on, capacitance of the DCG capacitor ($C_{DCG}$) and parasitic capacitance of the first DCG transistor DX1 can be provided to the first floating diffusion (FD) region FD1.

Similarly, in the ultra-low sensitivity mode, when the first DCG transistor DX1 and the second DCG transistor DX2 are turned on, not only the capacitance of the DCG capacitor ($C_{DCG}$) and capacitance of the second floating diffusion (FD) region FD2, but also parasitic capacitances of the first and second DCG transistors DX1 and DX2 can be provided to the first floating diffusion (FD) region FD1.

The first floating diffusion (FD) region FD1 may accumulate and store photocharges received from each of the first transfer transistors TX1_1 to TX1_$n$. The first floating diffusion (FD) region FD1 may refer to a region that is doped with second conductive impurities (e.g., N-type impurities) in the substrate (i.e., a first conductive substrate or a P-type substrate) including first conductive impurities (e.g., P-type impurities), and may be modeled as a single junction capacitor.

The first source follower transistor SF1 may be coupled between the power-supply voltage (VDD) and the first selection transistor SX1, may amplify a change in electrical potential of the first floating diffusion (FD) region FD1 having received photocharges accumulated in each of the first photoelectric conversion elements PD1_1 to PD1_$n$, and may transfer the amplified potential to the first selection transistor SX1.

The first selection transistor SX1 may be coupled between the first source follower transistor SF1 and the first output signal line (Vout1), and may be turned on in response to the first selection control signal SEL1 such that the electrical signal received from the first source follower transistor SF1 can be output to the first output signal line (Vout1).

As further explained below in FIGS. 4 and 5, the useful DCG capacitor ($C_{DCG}$) may be formed in a common or overlap region represented by the contact surface CS of two diagonal pixels PX1 and PX2 as shown in FIG. 2.

Figure 4:
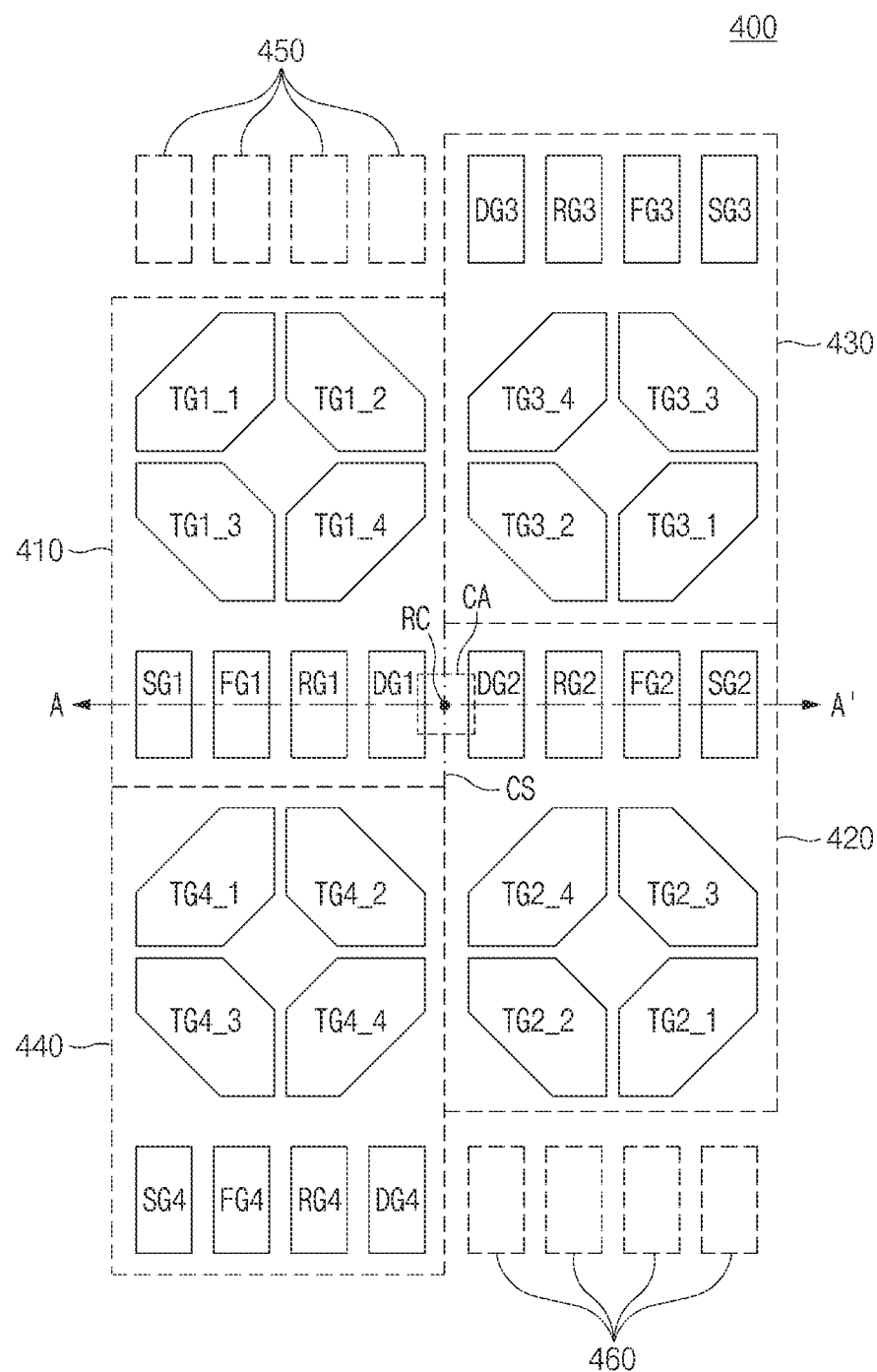
FIG. 4 is a plan view illustrating an example of first to fourth pixels shown in FIG. 2 based on some implementations of the disclosed technology.

FIG. 4 is a plan view illustrating an example of the first to fourth pixels PX1 to PX4 shown in FIG. 2 based on some implementations of the disclosed technology.

FIG. 4 is a schematic diagram illustrating an example of the first to fourth pixels PX1 to PX4 shown in FIG. 2, and illustrates a layout structure 400 including the first to fourth pixels 410 to 440. Each of the first to fourth pixels 410 to 440 may be a 4-shared pixel structure including four photoelectric conversion elements. Accordingly, the exemplary structure of FIG. 4 may correspond to the case in which 'n' is set to 4 (i.e., n=4) shown in FIG. 3.

The first pixel 410 may include a plurality of first transfer gates TG1_1 to TG1_4, a first selection gate SG1, a first source follower gate FG1, a first reset gate RG1, and a first DCG gate DG1.

The first transfer gates TG1_1 to TG1_4 may correspond to gates of the first transfer transistors TX1_1 to TX1_4 shown in FIG. 3, respectively. The first transfer gates TG1_1 to TG1_4 may be arranged in a (2×2) matrix array. Although not shown in the drawings, at least a portion of an impurity region corresponding to the first floating diffusion (FD) region FD1 may overlap with each of the first transfer gates TG1_1 to TG1_4 at the center portion of the first transfer gates TG1_1 to TG1_4. In addition, at least a portion of the impurity region corresponding to each of the first photoelectric conversion elements PD1_1 to PD1_4 may overlap with each of the first transfer gates TG1_1 to TG1_4. The impurity regions corresponding to the first photoelectric conversion elements PD1_1 to PD1_4 may be arranged in a (2×2) matrix array while being spaced apart from each other, and may also be spaced apart from the impurity region corresponding to the first floating diffusion (FD) region FD1.

In the first pixel 410, the first selection gate SG1, the first source follower gate FG1, the first reset gate RG1, and the first DCG gate DG1 may be sequentially arranged at a lower side of a region in which the first transfer gates TG1_1 to TG1_4 are arranged. Accordingly, the photoelectric conversion elements of the first pixel 410 may be disposed at an upper side of the first DCG gate DCG1.

The first selection gate SG1, the first source follower gate FG1, the first reset gate RG1, and the first DCG gate DG1 may correspond to a gate of the first selection transistor SX1, a gate of the first source follower transistor SF1, a gate of the first reset transistor RX1, and a gate of the first DCG transistor DX1 shown in FIG. 3, respectively.

The second pixel 420 may include a plurality of second transfer gates TG2_1 to TG2_4, a second selection gate SG2, a second source follower gate FG2, a second reset gate RG2, and a second DCG gate DG2. The second transfer gates TG2_1 to TG2_4, the second selection gate SG2, the second source follower gate FG2, the second reset gate RG2, and the second DCG gate DG2 may correspond to gates of the second transfer transistors TX2_1 to TX2_4, a gate of the second selection transistor SX2, a gate of the second source follower transistor SF2, a gate of the second reset transistor RX2, and a gate of the second DCG transistor DX2, respectively.

As discussed above, while the second pixel 420 is different from the first pixel 410 in terms of the relative arrangements of the transfer gates and other gates, the second pixel 420 may be substantially identical in terms of the structures of the elements to those of the first pixel 410. Thus, a detailed description on each of the elements included in the second pixel 420 will be omitted.

In the second pixel 420, the second DCG gate DG2, the second reset gate RG2, the second source follower gate FG2, and the second selection gate SG2 may be sequentially arranged at an upper side of a region in which the second transfer gates TG2_1 to TG2_4 are arranged. Accordingly, the photoelectric conversion elements of the second pixel 420 may be disposed at a lower side of the second DCG gate DCG2.

The first selection gate SG1, the first source follower gate FG1, the first reset gate RG1, and the first DCG gate DCG1 of the first pixel 410 may be arranged symmetrical to the second selection gate SG2, the second source follower gate FG2, the second reset gate RG2, and the second DCG gate DG2 of the second pixel 420 with respect to a contact surface CS between the first pixel 410 and the second pixel 420. In addition, the first selection gate SG1, the first source follower gate FG1, the first reset gate RG1, the first DCG gate DG1, the second DCG gate DG2, the second reset gate RG2, the second source follower gate FG2, and the second selection gate SG2 may be sequentially arranged in one row.

A common region CA may be disposed across the first pixel 410 and the second pixel 420 while overlapping with the contact surface CS. At least a portion of the common region CA may overlap with each of the first DCG gate DG1 and the second gate DG2, such that the common region CA may be formed to include at least some parts of the first DCG gate DG1 and the second gate DG2.

The common region CA may include a straight line meeting the contact surface CS, and the center point of the straight line will hereinafter be defined as a center of rotation (RC). The gates of the first pixel 410 may correspond to a structure that is formed by rotating the gates of the second pixel 420 with respect to the center of rotation (RC), and the gates of the first pixel 410 may correspond to a structure that is formed by rotating the gates of the second pixel 420 with respect to the center of rotation (RC). Thus, the gates of the first pixel 410 and the gates of the second pixel 420 may have rotational symmetry with respect to the center of rotation (RC).

The fourth pixel 440 disposed below the first pixel 410 may be substantially identical in structure to the first pixel 410, and the third pixel 430 disposed above the second pixel 420 may be substantially identical in structure to the second pixel 420. Thus, a detailed description on the elements of the third pixel 430 and the fourth pixel 440 will herein be omitted.

Transistors DG3, RG3, FG3, and SG3 of the third pixel 430 may be arranged in one row along with transistors 450 of an adjacent pixel arranged in an upward direction of the first pixel 410, and the above-mentioned description of the first pixel 410 and the second pixel 420 described above can also be substantially and equally applied not only to the adjacent pixel arranged in the upward direction of the first pixel 410, but also to the third pixel 430.

Transistors DG4, RG4, FG4, and SG4 of the fourth pixel 440 may be arranged in one row along with transistors 460 of an adjacent pixel arranged in a downward direction of the second pixel 420, and a detailed description of the first pixel 410 and the second pixel 420 described above can also be substantially and equally applied not only to the fourth pixel 440, but also to the adjacent pixel arranged in the downward direction of the second pixel 420.

Figure 5:
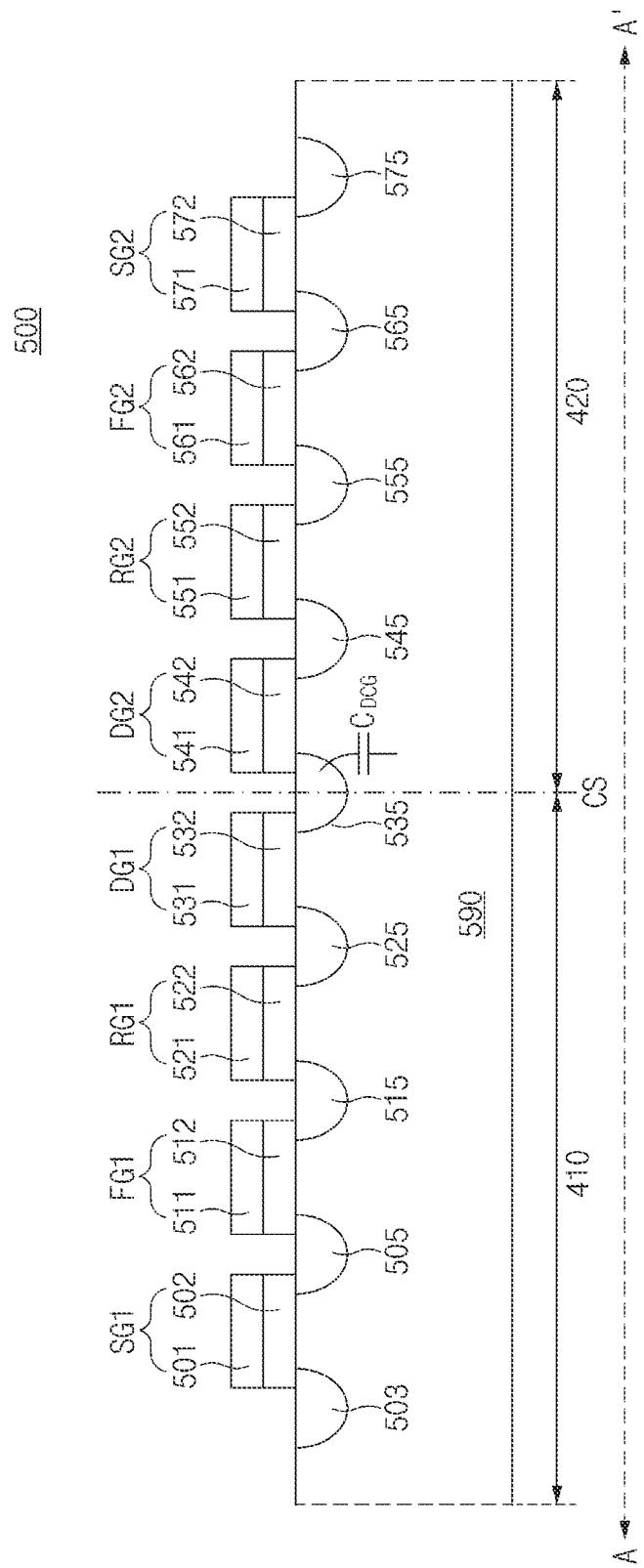
FIG. 5 is a cross-sectional view illustrating a layout structure taken along the line A-A' shown in FIG. 4 based on some implementations of the disclosed technology.

FIG. 5 is a cross-sectional view 500 illustrating a layout structure 400 taken along the line A-A' shown in FIG. 4 based on some implementations of the disclosed technology.

As can be seen from the cross-sectional view 500 of FIG. 5, a layout structure 400 including the first to fourth pixels 410 to 440 shown in FIG. 4 are taken along a first cutting line A-A' shown in FIG. 4.

Referring to FIG. 5, in the layout structure 400, the first selection gate SG1, the first source follower gate FG1, the first reset gate RG1, the first DCG gate DG1, the second DCG gate DG2, the second reset gate RG2, the second source follower gate FG2, and the second selection gate SG2 may be sequentially arranged along the first cutting line A-A'.

The first selection gate SG1 may include a gate electrode 501 for receiving a corresponding control signal or photocharges, and a gate insulation layer 502 disposed between a corresponding gate electrode and a substrate 590 to electrically insulate the corresponding gate electrode and the substrate 590. The first source follower gate FG1 may include a gate electrode 511 for receiving a corresponding control signal or photocharges, and a gate insulation layer 512 disposed between a corresponding gate electrode and the substrate 590 to electrically insulate the corresponding gate electrode and the substrate 590. The first reset gate RG1 may include a gate electrode 521 for receiving a corresponding control signal or photocharges, and a gate insulation layer 522 disposed between a corresponding gate electrode and the substrate 590 to electrically insulate the corresponding gate electrode and the substrate 590. The first DCG gate DG1 may include a gate electrode 531 for receiving a corresponding control signal or photocharges, and a gate insulation layer 532 disposed between the corresponding gate electrode and the substrate 590 to electrically insulate the corresponding gate electrode and the substrate 590. The second DCG gate DG2 may include a gate electrode 541 for receiving a corresponding control signal or photocharges, and a gate insulation layer 542 disposed between the corresponding gate electrode and the substrate 590 to electrically insulate the corresponding gate electrode and the substrate 590. The second reset gate RG2 may include a gate electrode 551 for receiving a corresponding control signal or photocharges, and a gate insulation layer 552 disposed between a corresponding gate electrode and the substrate 590 to electrically insulate the corresponding gate electrode and the substrate 590. The second source follower gate FG2 may include a gate electrode 561 for receiving a corresponding control signal or photocharges, and a gate insulation layer 562 disposed between the corresponding gate electrode and the substrate 590 to electrically insulate the corresponding gate electrode and the substrate 590. The second selection gate SG2 may include a gate electrode 571 for receiving a corresponding control signal or photocharges, and a gate insulation layer 572 disposed between the corresponding gate electrode and the substrate 590 to electrically insulate the corresponding gate electrode and the substrate 590.

The substrate 590 may be a semiconductor substrate formed by growing an epitaxial layer on a base substrate. Although the substrate 590 may include first conductive impurities (e.g., P-type impurities) or second conductive impurities (e.g., N-type impurities), other implementations are also possible. In some examples, it is assumed that the substrate 590 includes the first conductive impurities (e.g., P-type impurities).

Each of the impurity regions corresponding to the first photoelectric conversion elements PD1_1 to PD1_4 shown in FIG. 4 may be a region that is doped with second conductive impurities (e.g., N-type impurities) in the substrate 590. In addition, the impurity region corresponding to the first floating diffusion (FD) region FD1 may be a region that is doped with second conductive impurities (e.g., N-type impurities) in the substrate 590.

For example, each of the gate electrodes 501, 511, 521, 531, 541, 551, 561, and 571 may include a conductive material such as metal or polysilicon. Each of the gate insulation layers 502, 512, 522, 532, 542, 552, 562, and 572 may include at least one of a silicon oxide nitride film ($Si_xO_yN_z$, where each of 'x', 'y', and 'z' is a natural number), a silicon oxide film ($Si_xO_y$, where each of 'x' and 'y' is a natural number), and a silicon nitride film ($Si_xN_y$, where each of 'x' and 'y' is a natural number). In this case, the silicon oxide nitride film ($Si_xO_yN_z$), the silicon oxide film ($Si_xO_y$), and the silicon nitride film ($Si_xN_y$) may be formed of electrical insulation materials.

Impurity regions may be disposed at both sides of each of the first selection gate SG1, the first source follower gate FG1, the first reset gate RG1, the first DCG gate DG1, the second DCG gate DG2, the second reset gate RG2, the second source follower gate FG2, and the second selection gate SG2.

In more detail, the first impurity region 503 and the second impurity region 505 may be disposed at both sides of the first selection gate SG1. The second impurity region 505 and the third impurity region 515 may be disposed at both sides of the first source follower gate FG1. The third impurity region 515 and the fourth impurity region 525 may be disposed at both sides of the first reset gate RG1. The fourth impurity region 525 and the common region 535 may be disposed at both sides of the first DCG gate DG1. The common region 535 and the fifth impurity region 545 may be disposed at both sides of the second DCG gate DG2. The fifth impurity region 545 and the sixth impurity region 555 may be disposed at both sides of the second reset gate RG2. The sixth impurity region 555 and the seventh impurity region 565 may be disposed at both sides of the second source follower gate FG2. The seventh impurity region 565 and the eighth impurity region 575 may be disposed at both sides of the second selection gate SG2.

The common region 535 and each of the impurity regions 503, 505, 515, 525, 545, 555, 565, and 575 may refer to regions that are doped with second conductive impurities (e.g., N-type impurities) in the substrate 590 including first conductive impurities (e.g., P-type impurities). The common region 535 and each of the impurity regions 503, 505, 515, 525, 545, 555, 565, and 575 may correspond to a source or drain of each of the first selection transistor SX1, the first source follower transistor SF1, the first reset transistor RX1, the first DCG transistor DX1, the second DCG transistor DX2, the second reset transistor RX2, the second source follower transistor SF2, and the second selection transistor SX2.

In comparison with the circuit diagram of FIG. 3, the first impurity region 503 may be coupled to the first output signal line (Vout1), the third impurity region 515 may be coupled to the power-supply voltage (VDD), the fourth impurity region 525 may be coupled to the first floating diffusion (FD) region FD1, the fifth impurity region 545 may be coupled to the second floating diffusion (FD) region FD2, the sixth impurity region 555 may be coupled to the power-supply voltage (VDD), and the eighth impurity region 575 may be coupled to the second output signal line (Vout2).

On the other hand, since the common region 535 may refer to a region that is doped with second conductive impurities (e.g., N-type impurities) in the substrate 590 (i.e., a first conductive substrate such as a P-type substrate) including first conductive impurities (e.g., P-type impurities), a junction capacitor may be formed between the common region 535 and the substrate 590. In this case, the junction capacitor may correspond to the DCG capacitor ($C_{DCG}$) shown in FIG. 3. As a contact region between the common region 535 and the substrate 590 increases in size, the capacitance of the junction capacitor also increases. As a result, as the common region 535 increases in volume, the capacitance of the DCG capacitor ($C_{DCG}$) acting as the junction capacitor may also increase. Since the common region 535 may be formed across the first pixel 410 and the second pixel 420 that are diagonal to each other with a contact surface there between due to the spatial shift in the column direction, the common region 535 may be advantageously used to provide the DCG capacitor ($C_{DCG}$) having a relatively large capacitance to modulate the effective capacitance of the FD1 or FD2 by connecting to or disconnecting to this DCG capacitor ($C_{DCG}$) via the DX1 or DX2, respectively.

In a situation in which one impurity region (hereinafter referred to as a first impurity region) for a DCG capacitor is formed at one side of the first DCG gate DG1 in the first pixel 410 and the other impurity region (hereinafter referred to as a second impurity region) for a DCG capacitor is formed at one side of the second DCG gate DG2 in the second pixel 420, capacitance of the DCG capacitor provided by the first impurity region and capacitance of the DCG capacitor provided by the second impurity region may be smaller than capacitance of the DCG capacitor ($C_{DCG}$) provided by the common region 535.

As the DCG capacitor increases in size, sensitivity of the corresponding pixel may decrease in the low sensitivity mode, such that the dynamic range may be enlarged in the low sensitivity mode. For example, if the ratio of the dynamic range of the high sensitivity mode to the dynamic range of the low sensitivity mode needs to be set to 1:2, the dynamic range required for the low sensitivity mode can be more easily implemented using the DCG capacitor ($C_{DCG}$) having a relatively large capacitance.

As previously described in FIG. 3, in the low sensitivity mode or the ultra-low sensitivity mode, a specific floating diffusion (FD) region (e.g., FD1) may receive not only capacitance of the DCG capacitor ($C_{DCG}$) and capacitance of another floating diffusion (FD) region (e.g., FD2), but also parasitic capacitances of the first and second DCG capacitors DX1 and DX2, such that the dynamic range required for the low sensitivity mode or the ultra-low sensitivity mode can be more easily implemented. In this case, the parasitic capacitance may refer to capacitance of a parasitic capacitor (e.g., a parasitic capacitor formed between the first DCG gate DG1 and the common region 535) formed between the gate electrode and the impurity region.

In order to increase capacitance to be provided to the floating diffusion (FD) region in the low sensitivity mode, a method for increasing the size of the DCG capacitor (i.e., a method for increasing parasitic capacitance) may be used. However, as the region capable of being allocated to one pixel gradually decreases in size, there is a limitation in increasing the size of the DCG transistor within one pixel.

In addition, in order to increase capacitance to be provided to the floating diffusion (FD) region in the low sensitivity mode, a method for forming a Metal-Insulator-Metal (MIM) capacitor using the control signal line through which the DCG control signal is applied may be used, but the method for forming the MIM capacitor has disadvantages in that banding noise (e.g., black sun banding noise) unavoidably increases.

More specifically, pixels belonging to a specific row may be coupled to a single control signal line through which the DCG control signal is applied, and a voltage change of the floating diffusion (FD) region of any one pixel may affect a voltage level of a floating diffusion (FD) region of at least one of the pixels coupled to the same control signal line. This is because capacitive coupling occurs between the floating diffusion (FD) regions. In addition, the MIM capacitors coupled to the respective floating diffusion (FD) regions are coupled to only one control signal line, and each of the MIM capacitors may have a relatively large capacitance, such that the capacitive coupling between the floating diffusion (FD) regions may more significantly occur through the control signal line.

In contrast, in some implementations of the disclosed technology, the DCG capacitor ($C_{DCG}$) needed to increase capacitance to be provided to the floating diffusion (FD) region in the low sensitivity mode is not used as the capacitor coupled to the control signal line, such that banding noise can be advantageously prevented from increasing.

Since the first pixel 410 and the second pixel 420 belong to different rows, the first pixel 410 and the second pixel 420 may be controlled through different control signal lines, and may not be simultaneously read out as needed. Therefore, while the first pixel PX1 is read out, the DCG capacitor ($C_{DCG}$) may be used in the low sensitivity mode of the first pixel PX1. While the second pixel PX2 is read out, the DCG capacitor ($C_{DCG}$) may be used in the low sensitivity mode of the second pixel PX2.

In other words, the first pixel 410 and the second pixel 420 may be controlled through different control signals, and may output the pixel signals through different output signal lines. As a result, the first pixel 410 and the second pixel 420 may share the DCG capacitor ($C_{DCG}$) without causing collision or noise in operation periods.

The image sensing device based on some implementations of the disclosed technology can acquire capacitance required for the low sensitivity mode by changing a layout structure of pixels, without increasing the size of each pixel or without using a capacitor having a possibility of noise occurrence.

Figure 6:
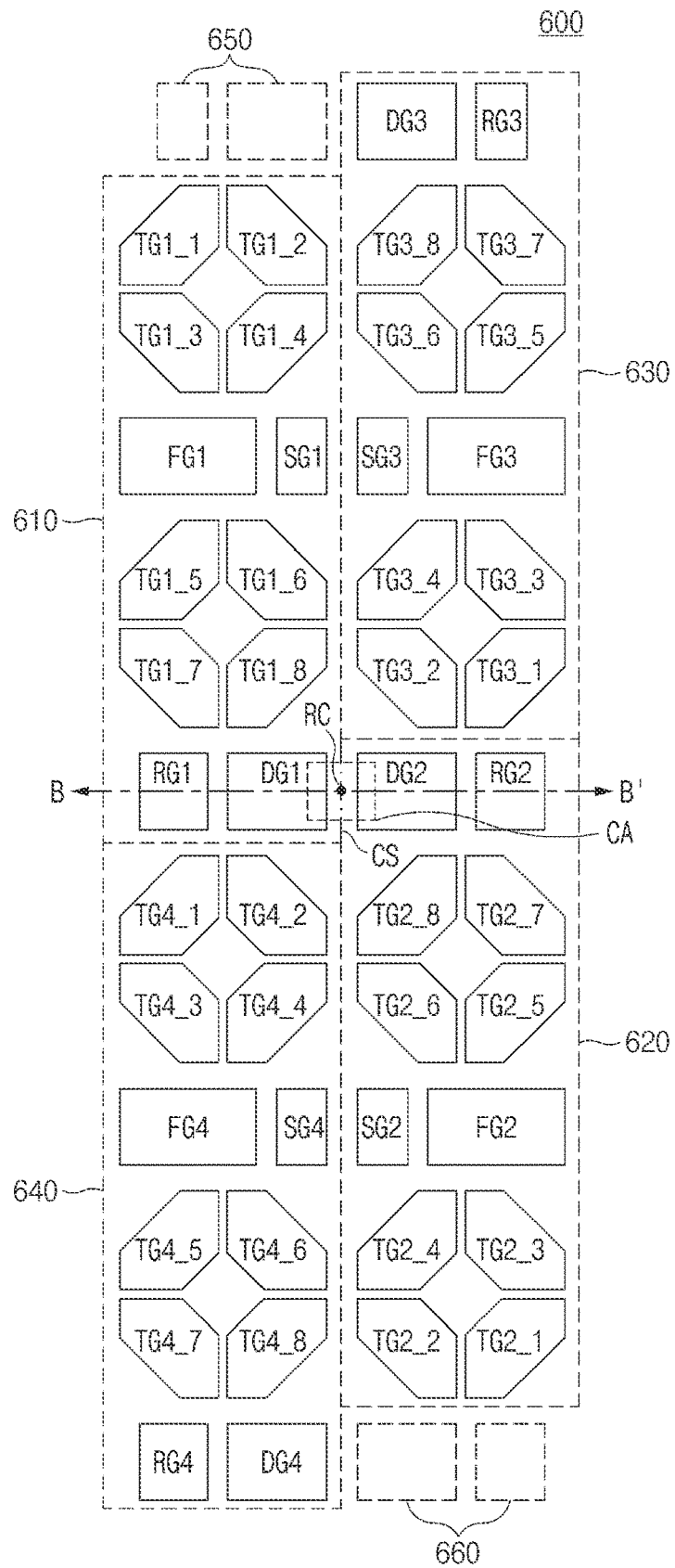
FIG. 6 is a plan view illustrating another example of first to fourth pixels shown in FIG. 2 based on some implementations of the disclosed technology.

FIG. 6 is a plan view illustrating another example of the first to fourth pixels PX1 to PX4 shown in FIG. 2 based on some implementations of the disclosed technology.

FIG. 6 is a schematic diagram illustrating another example of the first to fourth pixels PX1 to PX4 shown in FIG. 2, and illustrates a layout structure 600 including the first to fourth pixels 610 to 640. Each of the first to fourth pixels 610 to 640 may be an 8-shared pixel structure including eight photoelectric conversion elements. Accordingly, the exemplary structure of FIG. 6 may correspond to the case in which 'n' is set to 8 (i.e., n=8) shown in FIG. 3.

The first pixel 610 may include a plurality of first transfer gates TG1_1 to TG1_8, a first source follower gate FG1, a first selection gate SG1, a first reset gate RG1, and a first DCG gate DG1. The remaining components of the first pixel 610 other than some structures different from those of the first pixel 410 shown in FIG. 4 may be substantially identical in structure to those of the first pixel 410 shown in FIG. 4, and as such a detailed description thereof will herein be omitted for brevity. For convenience of description, the first pixel 610 shown in FIG. 6 will hereinafter be described centering upon characteristics different from those of the first pixel 410 shown in FIG. 4.

The plurality of first transfer gates TG1_1 to TG1_8 may be arranged in a (4×2) matrix array. In other words, the first transfer gates TG1_1 to TG1_4 arranged in a (2×2) matrix array may be vertically spaced apart by a predetermined distance from the first transfer gates TG1_5 to TG1_8 arranged in a (2×2) matrix array. Although not shown in FIG. 6, an impurity region corresponding to the first floating diffusion (FD) region FD1 may be disposed at the center portion of the first transfer gates TG1_1 to TG1_4, and the other impurity region corresponding to the first floating diffusion (FD) region FD1 may be disposed at the center portion of the first transfer gates TG1_5 to TG1_8. In this case, the two impurity regions may be electrically coupled to each other, resulting in formation of a single node. In addition, at least a portion of the impurity region corresponding to each of the first photoelectric conversion elements PD1_1 to PD1_8 may overlap with each of the first transfer gates TG1_1 to TG1_8. The impurity regions respectively corresponding to the first photoelectric conversion elements PD1_1 to PD1_8 may be spaced apart from each other, such that the impurity regions may be arranged in a (4×2) matrix array. In addition, the impurity regions may also be spaced apart from the other impurity regions corresponding to the first floating diffusion (FD) region FD1.

In the first pixel 610, the first source follower gate FG1 and the first selection gate SG1 may be disposed between the first transfer gates TG1_1 to TG1_4 and the other first transfer gates TG1_5 to TG1_8, and the first reset gate RG1 and the first DCG gate DG1 may be disposed at a lower side of the region in which the first transfer gates TG1_5 to TG1_8 are arranged. Accordingly, the photoelectric conversion elements of the first pixel 610 may be arranged to be separated from each other at an upper side and a lower side of the first source follower gate FG1 and the first selection gate SG1.

Subsequently, the second pixel 620 may include a plurality of second transfer gates TG2_1 to TG2_8, a second selection gate SG2, a second source follower gate FG2, a second reset gate RG2, and a second DCG gate DG2. In the second pixel 620, the remaining parts other than the arrangement form of the second pixel 620 may be substantially identical in structure to constituent elements of the first pixel 610, and as such a detailed description thereof will herein be omitted for brevity.

In the second pixel 620, the second reset gate RG2 and the second DCG gate DG2 may be disposed at an upper side of the region in which the second transfer gates TG2_5 to TG2_8 are arranged, and the second source follower gate FG2 and the second selection gate SG2 may be disposed between the second transfer gates TG2_1 to TG2_4 and the second transfer gates TG2_5 to TG2_8. Accordingly, the photoelectric conversion elements of the second pixel 620 may be arranged to be separated from each other at an upper side and a lower side of the second source follower gate FG2 and the second selection gate SG2.

The first reset gate RG1 and the first DCG gate DG1 of the first pixel 610 may be arranged symmetrical to the second reset gate RG2 and the second DCG gate DG2 of the second pixel 620 with respect to the contact surface CS between the first pixel 610 and the second pixel 620. In addition, the first reset gate RG1, the first DCG gate DG1, the second DCG gate DG2, and the second reset gate RG2 may be sequentially arranged in one row.

A common region CA may be disposed across the first pixel 610 and the second pixel 620 while overlapping with the contact surface CS. At least a portion of the common region CA may overlap with each of the first DCG gate DG1 and the second gate DG2, such that the common region CA may be formed integrally with the first DCG gate DG1 and the second gate DG2.

The common region CA may include a straight line formed to overlap with the contact surface CS, and the center point of the straight line will hereinafter be defined as the center of rotation (RC) for convenience of description. The gates of the first pixel 610 may correspond to a structure that is formed by rotating the gates of the second pixel 620 with respect to the center of rotation (RC), and the gates of the second pixel 620 may correspond to a structure that is formed by rotating the gates of the first pixel 610 with respect to the center of rotation (RC). That is, the gates of the first pixel 610 and the gates of the second pixel 620 may have rotational symmetry with respect to the center of rotation (RC).

The fourth pixel 640 disposed at a lower side of the first pixel 610 may be substantially identical in structure to the first pixel 610, and the third pixel 630 disposed at an upper side of the second pixel 620 may be substantially identical in structure to the second pixel 620, and as such a detailed description thereof will herein be omitted for brevity.

Transistors DG3 and RG3 of the third pixel 630 may be arranged in one row along with transistors 650 of an adjacent pixel arranged in an upward direction of the first pixel 610, and the above-mentioned description of the first pixel 610 and the second pixel 620 described above can also be substantially and equally applied not only to the adjacent pixel arranged in the upward direction of the first pixel 610, but also to the third pixel 630.

Transistors DG4 and RG4 of the fourth pixel 640 may be arranged in one row along with transistors 660 of an adjacent pixel arranged in a downward direction of the second pixel 620, and a detailed description of the first pixel 610 and the second pixel 620 described above can also be substantially and equally applied not only to the fourth pixel 640, but also to the adjacent pixel arranged in the downward direction of the second pixel 620.

Figure 7:
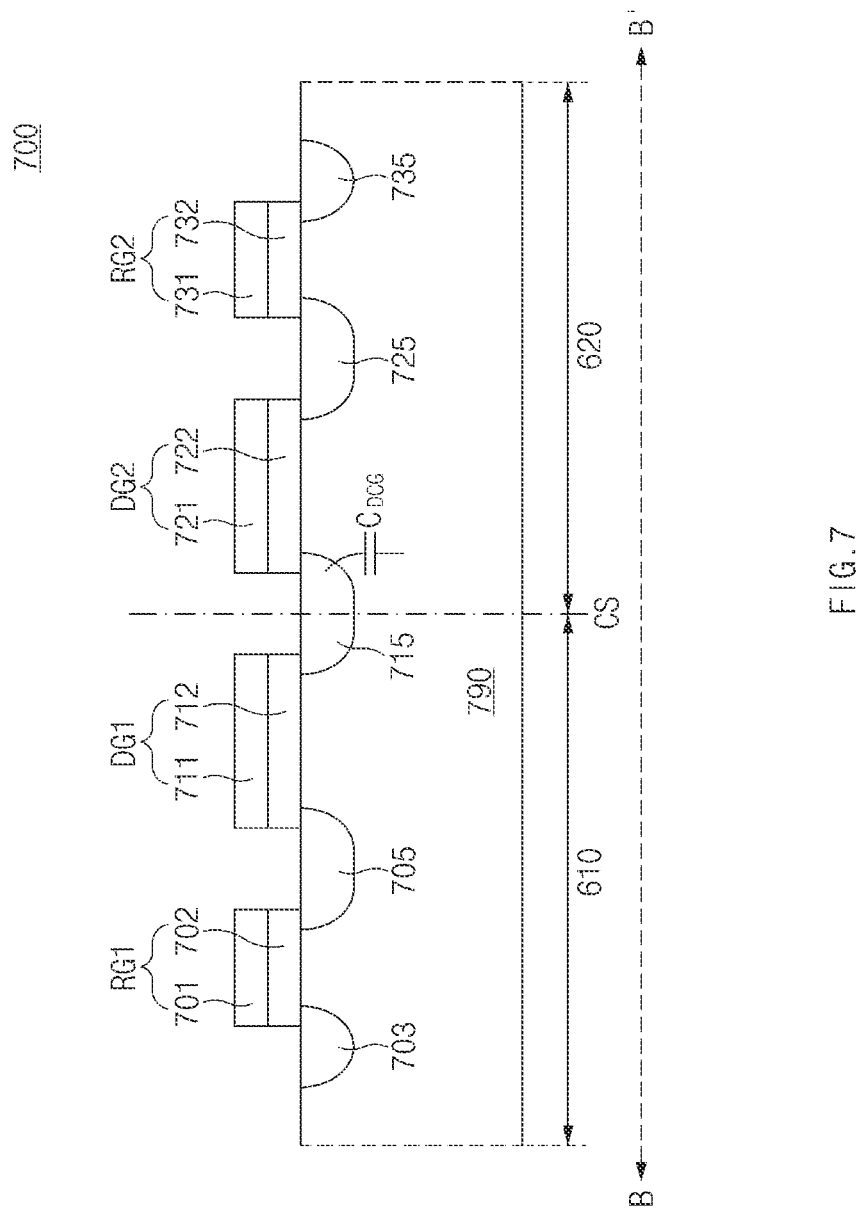
FIG. 7 is a cross-sectional view illustrating a layout structure taken along the line B-B' shown in FIG. 6 based on some implementations of the disclosed technology.

FIG. 7 is a cross-sectional view 700 illustrating the layout structure 600 taken along the line B-B' shown in FIG. 6 based on some implementations of the disclosed technology.

Referring to FIGS. 6 and 7, the layout structure 600 including the first to fourth pixels 610 to 640 shown in FIG. 6 are taken along a second cutting line B-B' shown in FIG. 6.

In the layout structure 600, the first reset gate RG1, the first DCG gate DG1, the second DCG gate DG2, and the second reset gate RG2 may be sequentially arranged along the second cutting line B-B'.

The first reset gate RG1 may include a gate electrode 701 for receiving a corresponding control signal, and a gate insulation layer 702 disposed between a corresponding gate electrode and a substrate 790 to electrically insulate the corresponding gate electrode and the substrate 790. The first DCG gate DG1 may include a gate electrode 711 for receiving a corresponding control signal, and a gate insulation layer 712 disposed between a corresponding gate electrode and the substrate 790 to electrically insulate the corresponding gate electrode and the substrate 790. The second DCG gate DG2 may include a gate electrode 721 for receiving a corresponding control signal, and a gate insulation layer 722 disposed between a corresponding gate electrode and the substrate 790 to electrically insulate the corresponding gate electrode and the substrate 790. The second reset gate RG2 may include a gate electrode 731 for receiving a corresponding control signal, and a gate insulation layer 732 disposed between the corresponding gate electrode and the substrate 790 to electrically insulate the corresponding gate electrode and the substrate 790.

The first reset gate RG1, the first DCG gate DG1, the second DCG gate DG2, and the second reset gate RG2 shown in FIG. 7 may be substantially identical in structure and function to the first rest gate RG1, the first DCG gate DG1, the second DCG gate DG2, and the second reset gate RG2 shown in FIG. 5, and as such a detailed description thereof will herein be omitted for brevity.

Impurity regions may be disposed at both sides of each of the first reset gate RG1, the first DCG gate DG1, the second DCG gate DG2, and the second reset gate RG2.

In more detail, the ninth impurity region 703 and the tenth impurity region 705 may be disposed at both sides of the first reset gate RG1. The tenth impurity region 705 and the common region 715 may be disposed at both sides of the first DCG gate DG1. The common region 715 and the eleventh impurity region 725 may be disposed at both sides of the second DCG gate DG2. The eleventh impurity region 725 and the twelfth impurity region 735 may be disposed at both sides of the second reset gate RG2.

The common region 715 and each of the impurity regions 703, 705, 715, 725, and 735 shown in FIG. 7 may be substantially identical in structure and function to the common region 535 and each of the impurity regions 515, 525, 545, and 555 shown in FIG. 5, and as such a detailed description thereof will herein be omitted for brevity.

In the same manner as in FIG. 5, the common region 715 formed across the first pixel 610 and the second pixel 620 may form a junction capacitor corresponding to the DCG capacitor ($C_{DCG}$) of FIG. 3 in association with the substrate 790. The DCG capacitor ($C_{DCG}$) provided by the common region 715 shown in FIG. 7 may be identical in function and effect to the DCG capacitor ($C_{DCG}$) provided by the common region 535 shown in FIG. 5, and as such a detailed description thereof will herein be omitted for brevity.

That is, even in the 8-shared pixel structure such as the first or second pixel 610 or 620, the image sensing device based on some implementations of the disclosed technology can acquire capacitance required for the low sensitivity mode by changing a layout structure of the pixels, without increasing the size of each pixel or without using a capacitor having a possibility of noise occurrence.

Although some implementations of the disclosed technology have disclosed the 4-shared pixel structure and the 8-shared pixel structure, other implementations are also possible. For example, the pixel can have only one photoelectric conversion element or have other shared pixel structures than the 4 or 8 shared pixel structure.

Although some implementations of the disclosed technology have disclosed the exemplary case in which a specific pixel is formed to share a common region with another pixel arranged at a lower right side or a left upper side of the specific pixel, other implementations are also possible. For example, the specific pixel can also share the common region with another pixel arranged at an upper right side or a left lower side of the the specific pixel. For example, as shown in FIG. 4, the left pixels 410 and 440 may be horizontally arranged symmetrical to the right pixels 420 and 430 with respect to a boundary line between the left pixels 410 and 440 and the right pixels 420 and 430.

As is apparent from the above description, the image sensing device based on some implementations of the disclosed technology can acquire capacitance required for a low sensitivity mode by changing a layout structure of pixels, without increasing the size of each pixel or without using a capacitor having a possibility of noise occurrence.

The embodiments of the disclosed technology may provide a variety of effects capable of being directly or indirectly recognized through the above-mentioned disclosure.

Although a number of illustrative embodiments have been described, it should be understood that modifications and enhancements to the disclosed embodiments and other embodiments can be devised based on what is described and/or illustrated in this disclosure.

What is claimed is:

1. An image sensing device, comprising:
   a pixel array configured to include a first pixel belonging to a first row and a first column, and a second pixel belonging to a second row adjacent to the first row and a second column adjacent to the first column, each of the first pixel and the second pixel including one or more photoelectric conversion elements structured to generate photocharges in response to incident light;
   a dual conversion gain (DCG) capacitor coupled between the first pixel and the second pixel; and
   a common region disposed at a contact surface between the first pixel and the second pixel,
   wherein
      the first pixel includes a first floating diffusion region configured to store the photocharges generated by the one or more photoelectric conversion elements of the first pixel and a first DCG transistor for selectively connecting the DCG capacitor to or disconnecting the DCG capacitor from the first floating diffusion region of the first pixel; and
      the second pixel includes a second floating diffusion region configured to store the photocharges generated by the one or more photoelectric conversion elements of the second pixel and a second DCG transistor for selectively connecting the DCG capacitor to or disconnecting the DCG capacitor from the second floating diffusion region of the second pixel;
      the second pixel is shifted upward in a column direction of the pixel array to form the contact surface; and
      the DCG capacitor is a junction capacitor formed between the common region and a substrate contacting the common region.

2. The image sensing device according to claim 1,
   wherein at least a portion of the common region overlaps with each of a first DCG gate of the first DCG transistor and a second DCG gate of the second DCG transistor.

3. The image sensing device according to claim 2, wherein:
   the first pixel and the second pixel have rotational symmetry with respect to a center point of a straight line where the contact surface meets the common region.

4. The image sensing device according to claim 2, wherein:
   the first DCG gate and the second DCG gate are arranged in a line along a first direction of the pixel array.

5. The image sensing device according to claim 2, wherein:
   a first reset gate for resetting the first floating diffusion region and the first DCG gate are arranged symmetrical to a second reset gate for resetting the second floating diffusion region and the second DCG gate with respect to the contact surface.

6. The image sensing device according to claim 2, wherein:
   each of the first pixel and the second pixel has a 4-shared pixel structure including four photoelectric conversion elements generating the photocharges corresponding to the incident light.

7. The image sensing device according to claim 6, wherein:
   the first DCG gate, a first reset gate for resetting the first floating diffusion region, a first source follower gate for generating an electrical signal corresponding to a voltage level of the first floating diffusion region, and a first selection gate for outputting the electrical signal of the first source follower gate are arranged in a line along a first direction of the pixel array; and
   the second DCG gate, a second reset gate for resetting the second floating diffusion region, a second source follower gate for generating an electrical signal corresponding to a voltage level of the second floating diffusion region, and a second selection gate for outputting the electrical signal of the second source follower gate are arranged in a line along the first direction of the pixel array.

8. The image sensing device according to claim 7, wherein:
   the first DCG gate, the first reset gate, the first source follower gate, and the first selection gate are arranged symmetrical to the second DCG gate, the second reset gate, the second source follower gate, and the second selection gate with respect to the contact surface.

9. The image sensing device according to claim 2, wherein:
   the one or more photoelectric conversion elements of the first pixel are disposed at an upper side of the first DCG gate; and
   the one or more photoelectric conversion elements of the second pixel are disposed at a lower side of the second DCG gate.

10. The image sensing device according to claim 2, wherein:
    each of the first pixel and the second pixel has an 8-shared pixel structure including eight photoelectric conversion elements generating the photocharges corresponding to the incident light.

11. The image sensing device according to claim 10, wherein:
the first DCG gate and a first reset gate for resetting the first floating diffusion region are spaced apart by a predetermined distance in a second direction of the pixel array from a first source follower gate for generating an electrical signal corresponding to a voltage level of the first floating diffusion region and a first selection gate for outputting the electrical signal of the first source follower gate;
the second DCG gate and a second reset gate for resetting the second floating diffusion region are spaced apart by a predetermined distance in the second direction of the pixel array from a second source follower gate for generating an electrical signal corresponding to a voltage level of the second floating diffusion region and a second selection gate for outputting the electrical signal of the second source follower gate; and
the second direction is same as the column direction.

12. The image sensing device according to claim 11, wherein:
the first DCG gate and the first reset gate are arranged symmetrical to the second DCG gate and the second reset gate with respect to the contact surface.

13. The image sensing device according to claim 11, wherein:
the one or more photoelectric conversion elements of the first pixel are arranged to be separated from each other at an upper side and a lower side of the first source follower gate and the first selection gate; and
the one or more photoelectric conversion elements of the second pixel are arranged to be separated from each other at an upper side and a lower side of the second source follower gate and the second selection gate.

14. The image sensing device of claim 1, wherein each of the first pixel and the second pixel is configured to store the photocharages in either a first operation mode or a second operation mode based on the capacitance of the first floating diffusion region and the capacitance of the second floating diffusion region, respectively.

15. An image sensing device, comprising:
a pixel array configured to include a first pixel at a first location and a second pixel arranged at a second location diagonal to the first location, each of the first pixel and the second pixel including one or more photoelectric conversion elements structured to generate photocharges in response to incident light;
a dual conversion gain (DCG) capacitor coupled between the first pixel and the second pixel; and
a common region disposed at a contact surface between the first pixel and the second pixel,
wherein
the first pixel includes a first dual conversion gain (DCG) gate configured to control a capacitance of a first floating diffusion region configured to store the photocharges generated by the first pixel;
the second pixel includes a second DCG gate configured to control a capacitance of a second floating diffusion region configured to store the photocharges generated by the second pixel; and
the common region overlaps with each of the first DCG gate and the second DCG gate;
the second pixel is shifted upward in a column direction of the pixel array to form the contact surface; and
the DCG capacitor is a junction capacitor formed between the common region and a substrate contacting the common region.

16. The image sensing device of claim 15, wherein the first DCG gate in the first pixel and the second DCG gate in the second pixel are configured to connect the DCG capacitor to, or disconnect the DCG capacitor from, the first or second floating diffusion region, respectively, to control the capacitance of the first or second floating diffusion region, respectively.

17. The image sensing device of claim 15, wherein the first pixel and the second pixel are arranged in different adjacent rows and different adjacent columns.

18. An image sensing device, comprising:
a pixel array configured to include a first pixel belonging to a first row and a first column, and a second pixel belonging to a second row adjacent to the first row and a second column adjacent to the first column, each of the first pixel and the second pixel including one or more photoelectric conversion elements structured to generate photocharges in response to incident light; and
a dual conversion gain (DCG) capacitor coupled between the first pixel and the second pixel,
wherein
the first pixel includes a first floating diffusion region configured to store the photocharges generated by the one or more photoelectric conversion elements of the first pixel and a first DCG transistor for selectively connecting the DCG capacitor to or disconnecting the DCG capacitor from the first floating diffusion region of the first pixel; and
the second pixel includes a second floating diffusion region configured to store the photocharges generated by the one or more photoelectric conversion elements of the second pixel and a second DCG transistor for selectively connecting the DCG capacitor to or disconnecting the DCG capacitor from the second floating diffusion region of the second pixel,
wherein:
the one or more photoelectric conversion elements of the first pixel are disposed at an upper side of a first DCG gate of the first DCG transistor; and
the one or more photoelectric conversion elements of the second pixel are disposed at a lower side of a second DCG gate of the second DCG transistor.

19. The image sensing device of claim 18, wherein the second pixel is shifted upward in a column direction of the pixel array to form a contact surface through which the first pixel and the second pixel are coupled to each other.

* * * * *